United States Patent
Wahl

(10) Patent No.: US 7,559,085 B1
(45) Date of Patent: Jul. 7, 2009

(54) DETECTION FOR DECEPTIVELY SIMILAR DOMAIN NAMES

(75) Inventor: Mark F. Wahl, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 887 days.

(21) Appl. No.: 10/917,714

(22) Filed: Aug. 13, 2004

(51) Int. Cl.
*G06F 7/04* (2006.01)
*H04L 9/32* (2006.01)

(52) U.S. Cl. ............................ 726/22; 726/17; 726/21; 713/151

(58) Field of Classification Search ............... None
See application file for complete search history.

(56) References Cited

U.S. PATENT DOCUMENTS

| 2002/0059078 | A1* | 5/2002 | Valdes et al. ............ 705/1 |
| 2004/0078422 | A1* | 4/2004 | Toomey ................... 709/202 |
| 2005/0257261 | A1* | 11/2005 | Shraim et al. ........... 726/22 |
| 2006/0021031 | A1* | 1/2006 | Leahy et al. ............. 726/22 |
| 2006/0123464 | A1* | 6/2006 | Goodman et al. ....... 726/2 |

\* cited by examiner

*Primary Examiner*—Kaveh Abrishamkar
(74) *Attorney, Agent, or Firm*—Osha • Liang LLP

(57) ABSTRACT

A system including a client configured to obtain a target domain name and an Internet service configured to translate the target domain name into a target identifier and compare the target identifier to a domain name table to obtain a similarity list.

17 Claims, 4 Drawing Sheets

DETECTION FOR DECEPTIVELY SIMILAR DOMAIN NAMES

BACKGROUND

A common technique used to entice Internet users to visit certain web sites or disclose information is to present the users with a universal resource locator (URL) that the user is encouraged to access. For example, while surfing the Internet, pop-up advertisements, unsolicited e-mails, or links to certain web sites may be presented to the user. The web site links or pop-up advertisements presented to the user in this manner often appear to be a web site with which the user already has familiarity. In some instances, these web sites are deceptively chosen by an attacker who wishes the user to visit a different web site than the one presented.

For example, a typical form of deceptive attacks includes presenting a URL that appears to contain a certain domain name (e.g., www.microsoft.com), but actually includes a different host name for which the domain name presented is only a parameter (e.g., www.microsoft.com@foo.com). Another example of this type of attack uses host names that are deceptively similar to other popular and known host names. For example, a user may be presented with a URL for www.1BM.com, where the host name appears deceptively similar to www.IBM.com (in fact, the deceptive web site has the number "1" instead of the letter "I").

A possible solution to prevent deceptively similar domain names is to buy all the domain names that appear similar to a particular domain name in order to prevent the purchase of the similar domain names by an attacker. For example, a company may decide to buy all the domain names that may be easily confused with the company's actual domain names. However, the domain name system is currently being upgraded to support international characters based on the Unicode/ISO 10646 standard character sets, so the number of deceptively similar characters will be increasing. Therefore, the possibility of a particular company buying all the deceptively similar web sites to protect the company's own domain name is no longer feasible. Additionally, when legitimate domain names contain characters outside of the US/Western Europe character sets, the scope of possible attacks becomes much greater.

Another conventional method to prevent such an attack is to use Secure Socket Layer (SSL) certificates. SSL is a protocol that relies upon a mutually trusted certificate authority (CA) to ensure secure transactions between web servers and web browsers. Typically, a browser requests a secure web page and the corresponding web server sends the browser the public key in the certificate associated with that web server. Subsequently, the browser checks to ensure that the certificate was issued from a trusted party (i.e., a root CA) and that the certificate is related to the actual web site contacted by the browser. At this point, the web server uses both the public key and a private key, and the web browser uses the public key to transfer data securely.

Alternatively, in another common method to prevent these types of attacks, a particular company may register its domain name in a portion of a domain name system where the domain name system includes certain restriction policies that prevent the presence of deceptively similar domain names. For example, some domain name service operators for country domains may restrict domain name registrations to be based on the company name in a national business database. The national business database is typically operated by the government of that particular country.

SUMMARY

In general, in one aspect, the invention relates to a system comprising a client configured to obtain a target domain name, and an Internet service configured to translate the target domain name into a target identifier and compare the target identifier to a domain name table to obtain a similarity list.

In general, in one aspect, the invention relates to a method for detecting deceptive domain names comprising obtaining a target domain name, translating the target domain name to obtain a target identifier, comparing the target identifier to a domain name table to obtain a similarity list, and determining whether the target domain name is deceptive using the similarity list.

In general, in one aspect, the invention relates to A computer system for detecting deceptive domain names comprising a processor, a memory, a storage device, and software instructions stored in the memory for enabling the computer system under control of the processor, to obtain a target domain name, translate the target domain name to obtain a target identifier, compare the target identifier to a domain name table to obtain a similarity list, and determine whether the target domain name is deceptive using the similarity list.

Other aspects of the invention will be apparent from the following description and the appended claims.

DETAILED DESCRIPTION

Figure 1:
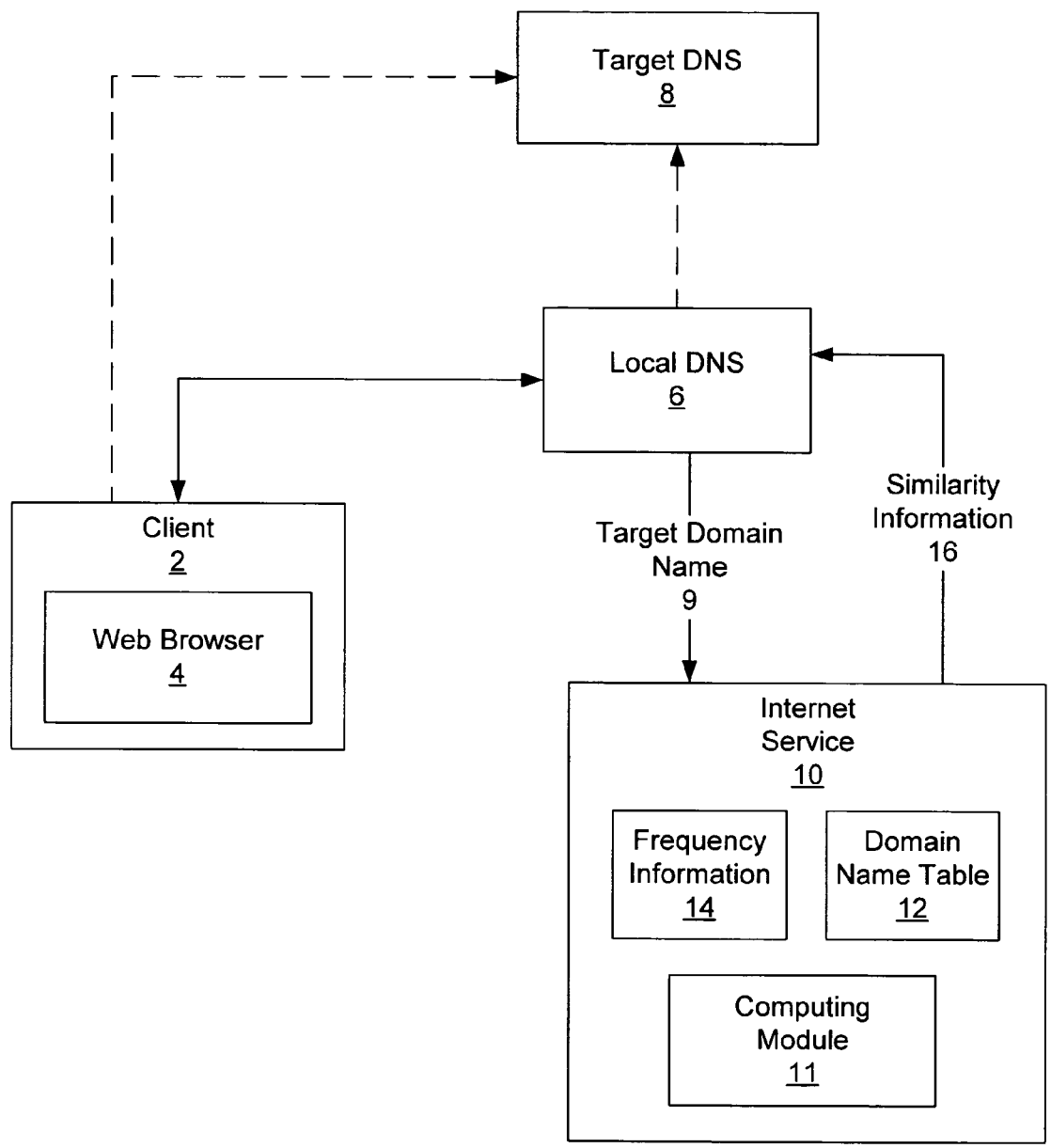
FIG. 1 shows a flow diagram for detecting deceptive domain names in accordance with an embodiment of the invention.

Exemplary embodiments of the invention will be described with reference to the accompanying drawings. Like items in the drawings are shown with the same reference numbers. Further, the use of "ST" in the drawings is equivalent to the use of "Step" in the detailed description below.

In an embodiment of the invention, numerous specific details are set forth in order to provide a more thorough understanding of the invention. In other instances, well-known features have not been described in detail to avoid obscuring the invention.

In general, embodiments of the invention relate to using a method and apparatus to detect deceptively similar domain names presented to a user. One or more embodiments of the invention relate to generating an identifier for common popular web sites and assigning the same identifier to domain names that appear similar. One or more embodiments of the invention relate to comparing identifiers of various domain names in order to prevent users from visiting unknown or unwanted web sites.

FIG. 1 shows a flow diagram for detecting deceptive domain names in accordance with one embodiment of the invention. When a client (2) (i.e., user) clicks on a web browser (4) may visit various domains (i.e., URLs, web sites, etc.) while using the Internet. Additionally, the client (2) may be presented with target domain names (i.e., any domain name presented to the client that the client attempts to access) via unsolicited e-mail, web site pop-up advertisements, a link to another web page, etc. When the client (2) clicks on a presented target domain name, a request for the domain name server (DNS) record corresponding to the target domain name (i.e., a record of the DNS information for a particular domain name and link to the domain name's IP address) is sent to a local DNS (6). The local DNS (6) includes functionality to cache DNS records for domain names frequently visited by the client (2). For example, the local DNS (6) may be a software component that is installed on the client system, installed on a server located on the same (or nearby) local area network (LAN), or on a server operated by the Internet Service Provider (ISP) from which the client obtains their network connection. However, if the local DNS (6) does not have a cached entry for the target domain name, then the local DNS (6) may contact a root DNS (not shown). The root DNS may in turn contact a target DNS (8), which includes the DNS record for the target domain name.

In one embodiment of the invention, along with forwarding the request for the DNS record to the root DNS (if the local DNS (6) does not have the DNS record cached), the local DNS (6) also forwards the target domain name (9) to an Internet service (10). In one embodiment of the invention, the Internet service (10) may include a computing module (11), a domain name table (12) and frequency information (14). The computing module (11) includes functionality to compute similarity codes for each character in the target domain name (9) and assign an identifier to the target domain name (9). The similarity code is a code assigned to a valid character by which to identify that particular character. In one embodiment of the invention, a string of similarity codes (i.e., one for each character in the target domain name) forms an identifier for a particular target domain name (9).

In one embodiment of the invention, similar domain names would have the same identifier. In addition, in one embodiment of the invention, characters which appear to be similar in a low resolution font (defined by the algorithm developer) are given the same similarity code. For example, the US/Western Europe characters 'l' and 'I' (i.e., the letters lowercase L and uppercase I) would be given the same similarity code.

Continuing with FIG. 1, as noted above, the Internet service (10) includes the domain name table (12), which contains several pre-computed identifiers for the most common, popular, and legitimate domain names. For example, in one embodiment of the invention, the domain name table (12) may include domain names and corresponding identifiers for banking, portal, commerce, search engine, etc. web sites. Additionally, in one embodiment of the invention, the Internet service (10) includes frequency information (14) regarding how often the common and popular web sites are visited.

One skilled in the art will appreciate that the domain name table and frequency information may be updated periodically based on Internet traffic surveys. In one embodiment of the invention, this may be implemented by allowing the Internet service to receive information from various corporations and research organizations that gather Internet traffic data, or through a subscription from a trusted source of this information.

In one embodiment of the invention, the Internet service forwards similarity information (i.e., frequency information and domain name identifiers) to the local DNS (6). For example, FIG. 1 shows similarity information (16) being sent from the Internet service (10) to the local DNS (6). Subsequently, the local DNS (6) may send similarity information to the client. When the client receives this information from the local DNS, the client may directly contact the target DNS if the client determines that the target domain name is not deceptive (or if the client wishes to access the target domain name for any other reason).

Figure 2:
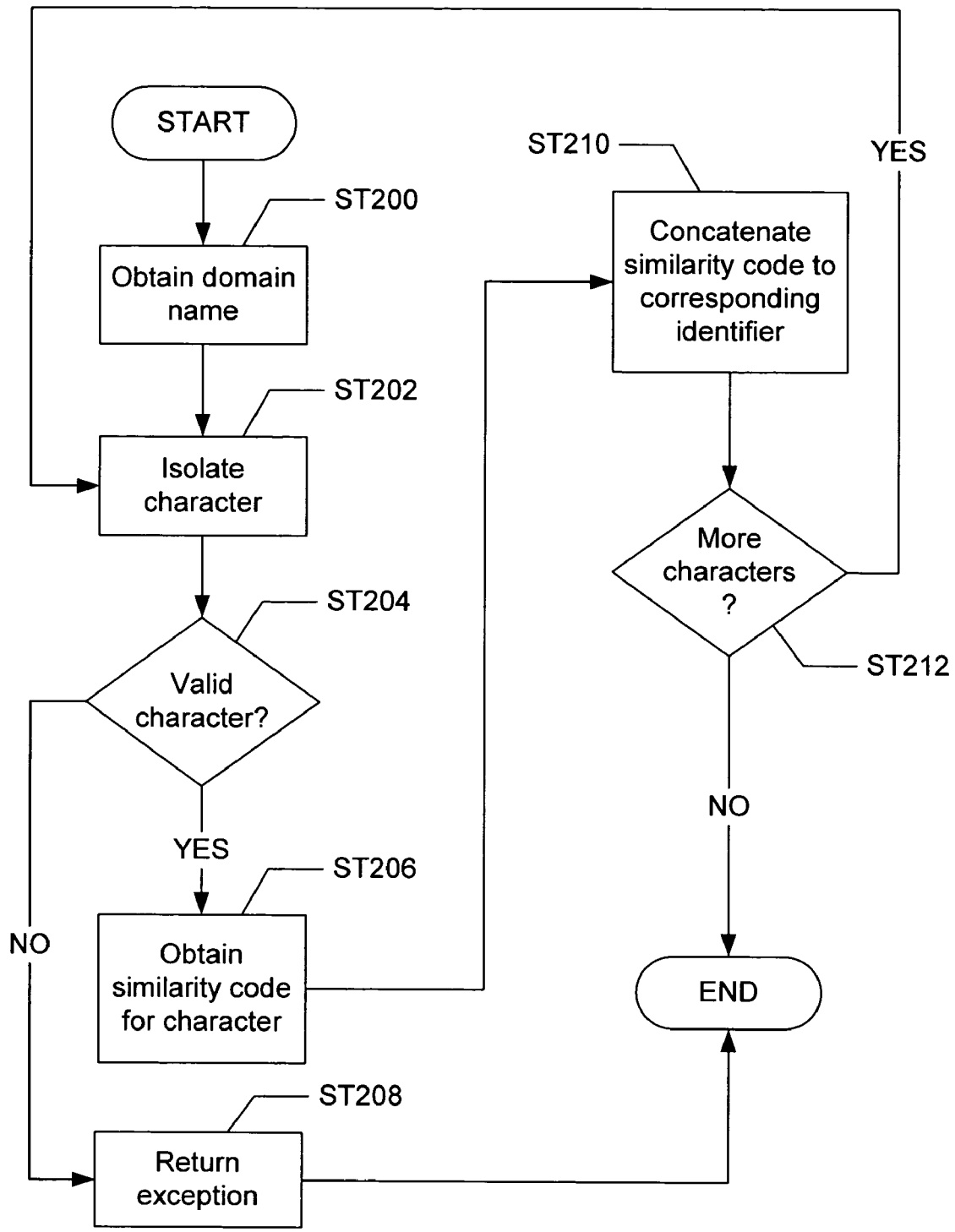
FIG. 2 shows a flow chart for applying an algorithm to detect deceptive domain names in accordance with an embodiment of the invention.

As noted above, embodiments of the invention use an algorithm to detect deceptively similar domain names and presents these deceptive domain names to the user (i.e., the client). FIG. 2 shows a flow chart for the algorithm used to detect deceptive domain names in accordance with one embodiment of the invention. Initially, the algorithm obtains a domain name (Step 200). Subsequently, each character in the domain name is isolated (Step 202). The algorithm then determines whether the first isolated character (i.e., the first character in the domain name) is valid (Step 204). In one embodiment of the invention, a character that is outside of the acceptable range (e.g., control characters, non-printing characters, etc.) may be considered invalid.

If the first isolated character is determined to be a valid character, a similarity code is obtained for the character (Step 206). In contrast, if the first isolated character is determined to be invalid, the algorithm returns an exception and does not continue to analyze that particular domain name (Step 208). In other words, the entire domain name is considered invalid by the algorithm and the process ends.

Once the first isolated character of the domain name has been given a similarity code, the similarity code is concatenated with the previously calculated similarity codes for the domain name string to form an identifier (Step 210). One skilled in the art will appreciate that the first character in the domain name string will not have previous similarity codes to be concatenated with. However, each similarity code after the initial character will be concatenated with the previous similarity code of the domain name string. Subsequently, if more characters remain for which to compute a similarity code (Step 212), Steps 204-210 are repeated for each character in the domain name string.

One skilled in the art will appreciate that, over time, similarity codes may be modified to include international languages such as Tamil, Hindi, Cyrillic, Arabic, etc. Additionally, those skilled in the art will appreciate that different regions of the world may view characters in a different manner. For example, someone from China may view two US/Western Europe characters to be deceptively similar, where as someone from the US/Western Europe may find those same characters individually distinct. Therefore, similarity codes may be determined from the point of view of many different parts of the world. Accordingly, different similarity code tables may be available and used based on the physical location of the web browser that is presented with a target domain name. This may be implemented, for example, by analyzing the IP address of the originating DNS query from a particular client or web browser and adjusting the location of the analysis accordingly.

Figure 3:
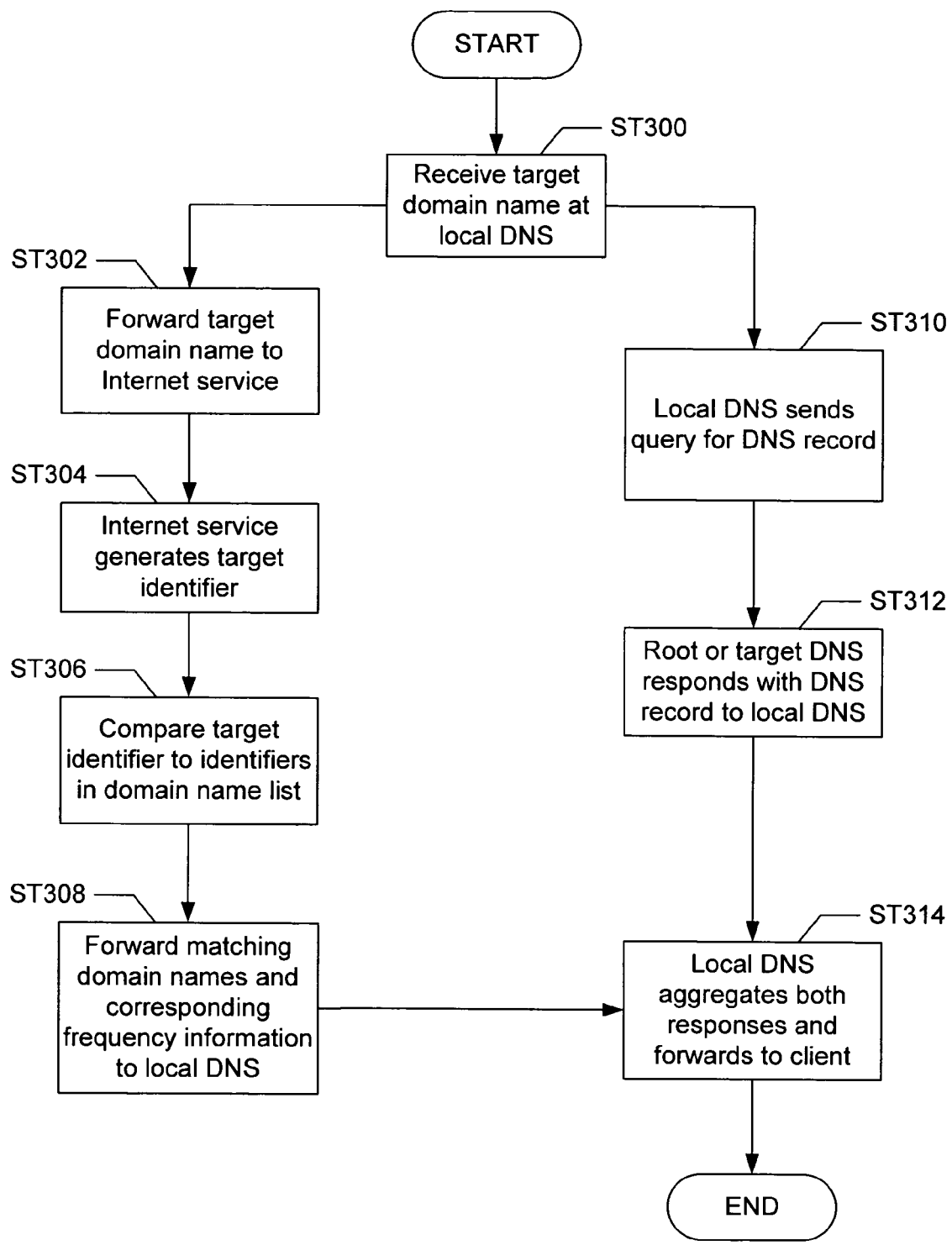
FIG. 3 shows a flow chart for using an algorithm to detect deceptive domain names in accordance with an embodiment of the invention.

FIG. 3 shows a flow chart for using the algorithm to detect deceptive domain names in accordance with one embodiment of the invention. One skilled in the art will appreciate that the flow chart shown in FIG. 3 is depicted with two paths that eventually merge in order to illustrate that both paths may occur in parallel.

Initially, a target domain name is received at the local DNS (Step 300). The target domain name may be forwarded to the local DNS by a web browser client, an e-mail client, a registration system used by a certificate authority, etc. Subsequently, the target domain name is forwarded to the Internet service (Step 302). The Internet service then uses a computing module to generate a target identifier corresponding to the target domain name received from the local DNS (Step 304).

The target identifier is then compared to the target identifiers included in the domain name table of the Internet service (Step 306). If any matches are determined, the matching domain names and corresponding frequency information is forwarded to the local DNS (Step 308).

In parallel to Step 302, the local DNS sends a query for the DNS record for the target domain name (Step 310). Subsequently, either the target DNS or the root DNS forwards the DNS record of the target domain name to the local DNS (Step 312). In one embodiment of the invention, the DNS record for the target domain name may be cached in the root DNS. In this case, the root DNS may respond to the local DNS with the target domain name address and the local DNS may then directly contact the target DNS to obtain the record (i.e., using the address given by the root DNS). In contrast, if the DNS record query is forwarded from the local DNS to the root DNS, the root DNS may contact the DNS of the target domain name in order to obtain the DNS record. Subsequently, the local DNS of the client that initiated the request aggregates the information from the Internet service and the DNS record information into one reply. In one embodiment of the invention, the information from the Internet service may be placed in a DNS Text Resource Record in the reply to the client. This reply is then forwarded to the client's web browser (Step 314) and the process ends.

In one embodiment of the invention, the client may then contact the target DNS if the user wishes to access the target domain name web site. Alternatively, the user may be presented with the deceptively similar domain names and asked whether to proceed to one or more of the domains. The web browser may display similarity information via a menu, a separate browser window, etc. In one embodiment of the invention, if the client chooses to visit the target DNS, the web browser may display some type of warning message to the user outside of the target domain name web page, e.g., "this page is not a known web page."

Figure 4:
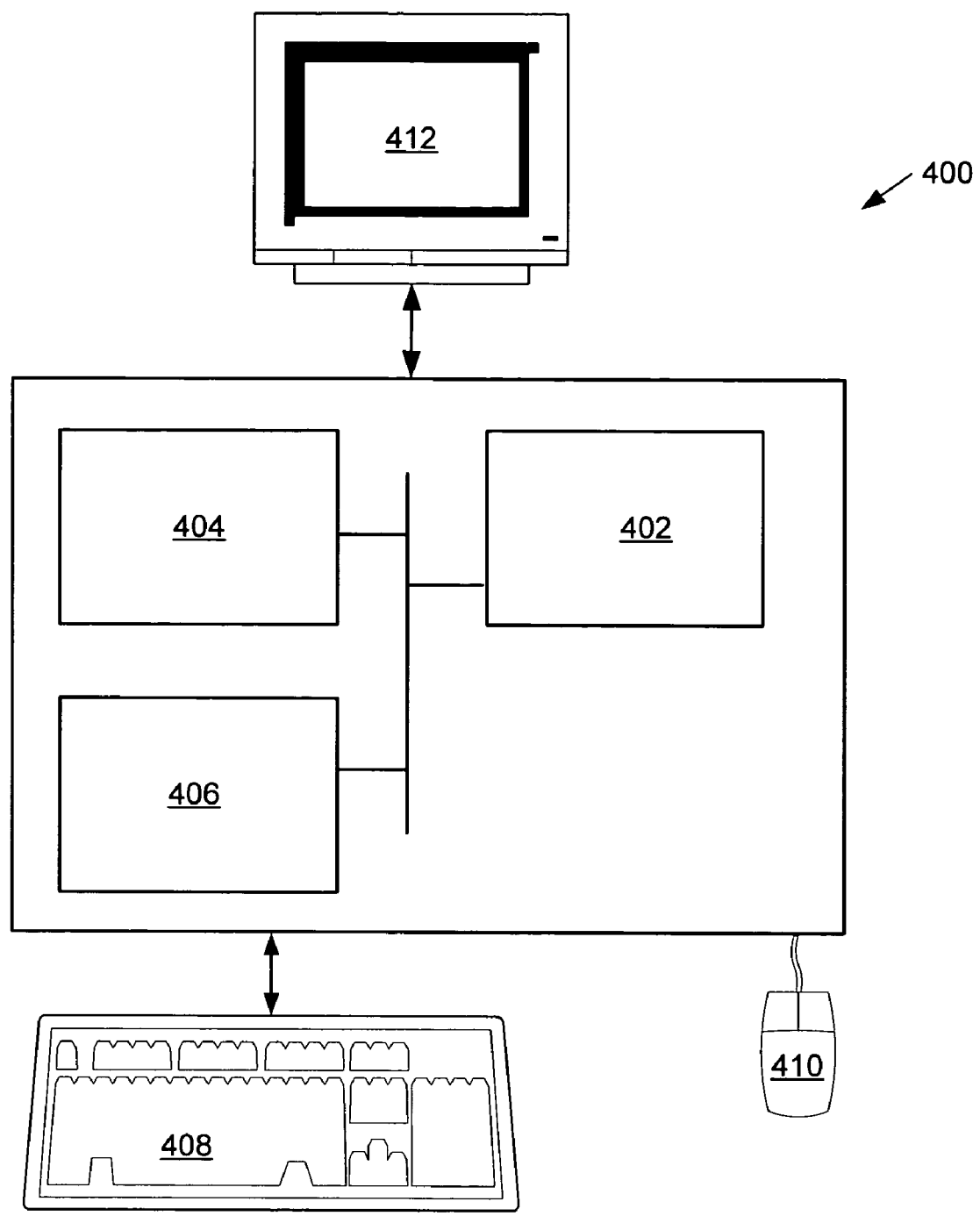
FIG. 4 shows a computer system in accordance with an embodiment of the invention.

Embodiments of the invention may be implemented on virtually any type of computer regardless of the platform being used. For example, as shown in FIG. 4, a networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). The networked computer system (400) is connected to a local area network (LAN) or a wide area network (WAN) via a network interface connection (not shown). Those skilled in the art will appreciate that these input and output means may take other forms. Further, those skilled in the art will appreciate that one or more elements of the aforementioned computer (400) may be located at a remote location and connected to the other elements over a network.

Embodiments of the invention include the ability to detect deceptive domain names that appear similar to common and popular domain names. More specifically, embodiments of the invention provide detailed information to an Internet user that a web page the user is viewing or is enticed to view may not be a legitimate domain name. Additionally, embodiments of the invention allow a user to be warned before visiting invalid or illegitimate domain names so that a user may not divulge information to unknown or unwanted web sites. This may prevent identity theft, unknown purchases, credit card theft, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
a local domain name server configured to receive a target domain name from a client and send the target domain name to an Internet service; and
the Internet service comprising a domain name table, wherein the domain name table comprises a plurality of domain names and wherein each of the plurality of domain names is associated with a pre-computed target identifier,
wherein the Internet service is configured to:
receive the target domain name from the local domain name service,
translate the target domain name into a target identifier,
compare the target identifier to the plurality of domain names in the domain name table to obtain a similarity list,
wherein the similarity list comprises at least one of the plurality of domain names,
wherein the pre-computed target identifier associated with at least one of the plurality of domain names is equal to the target identifier,
wherein the target identifier comprises a similarity code for each character in the target domain name,
wherein the similarity code is based on similarity of appearance of each character in a low resolution font,
wherein a first character is assigned the same similarity code as a second character when similar in appearance in the low resolution font, and
wherein the target identifier is the same as the pre-computed target identifier of the at least one of the plurality of domain names when both domain names are similar in appearance in the low resolution font; and
send the similarity list to the local domain name server, wherein the local domain name server sends the similarity list to the client, and wherein the client is configured to display the similarity list to a user.

2. The system of claim 1, wherein the local domain name server is further configured to obtain a target domain name record corresponding to the target domain name and aggregate the target domain name record with the similarity list in a response to the client.

3. The system of claim 1, wherein the domain name table is periodically updated.

4. The system of claim 1, wherein the Internet service further comprises frequency information, wherein the frequency information is periodically updated.

5. The system of claim 1, wherein the similarity code for each character in the target domain name is concatenated to form the target identifier.

6. The system of claim 1, wherein the Internet service is further configured to store the similarity code.

7. The system of claim 1, wherein the similarity list further comprises frequency information associated with the at least one of the plurality of domain names.

8. A method for detecting deceptive domain names comprising:
obtaining a target domain name;
translating the target domain name to obtain a target identifier, wherein the target identifier comprises a similarity code for each character in the target domain name, wherein the similarity code is based on similarity of appearance of each character in a low resolution font, and wherein a first character is assigned the same similarity code as a second character when similar in appearance in the low resolution font;

comparing the target identifier to a plurality of domain names in a domain name table to obtain a similarity list, wherein each of the plurality of domain names is associated with a pre-computed target identifier, wherein the pre-computed target identifier associated with at least one of the plurality of domain names is equal to the target identifier, and wherein the target identifier is the same as the pre-computed target identifier of the at least one of the plurality of domain names when both domain names are similar in appearance in the low resolution font, and wherein the similarity list comprises at least one of the plurality of domain names; and determining whether the target domain name is deceptive using the similarity list.

9. The method of claim 8, further comprising:

resolving the target domain name to obtain a target domain name server record;

aggregating the target domain name server record with the similarity list; and forwarding a response to a client.

10. The method of claim 9, wherein the client is configured to display the similarity list to a user.

11. The method of claim 9, wherein the target domain name server record may be obtained from a root domain name server.

12. The method of claim 9, wherein the target domain name server record may be cached in a local domain name server.

13. The method of claim 8, wherein the domain name table comprises at least one domain name and an identifier corresponding to the domain name.

14. The method of claim 8, wherein the similarity code for each character in the target domain name is concatenated to form the target identifier.

15. A computer system for detecting deceptive domain names comprising:

a processor;

a memory;

a storage device; and software instructions stored in the memory for enabling the computer system under control of the processor, to:

obtain a target domain name;

translate the target domain name to obtain a target identifier, wherein the target identifier comprises a similarity code for each character in the target domain name, wherein the similarity code is based on similarity of appearance of each character in a low resolution font, and wherein a first character is assigned the same similarity code as a second character when similar in appearance in the low resolution font;

compare the target identifier to a plurality of domain names in a domain name table to obtain a similarity list, wherein each of the plurality of domain names is associated with a pre-computed target identifier, wherein the pre-computed target identifier associated with at least one of the plurality of domain names is equal to the target identifier, and wherein the target identifier is the same as the pre-computed target identifier of the at least one of the plurality of domain names when both domain names are similar in appearance in the low resolution font, and wherein the similarity list comprises at least one of the plurality of domain names; and determine whether the target domain name is deceptive using the similarity list.

16. The computer system of claim 15, further comprising software instructions stored in the memory for enabling the computer system under control of the processor, to:

resolve the target domain name to obtain a target domain name server record;

aggregate the target domain name server record with the similarity list; and forward a response to the client.

17. The computer system of claim 15, wherein the similarity code for each character in the target domain name is concatenated to form the target identifier.

* * * * *